(12) United States Patent
Xu

(10) Patent No.: US 8,830,474 B2
(45) Date of Patent: Sep. 9, 2014

(54) EXTERNAL/INTERNAL OPTICAL ADAPTER WITH REVERSE BIASED PHOTODIODES FOR FTIR SPECTROPHOTOMETRY

(75) Inventor: Zhi Xu, St. Louis, MO (US)

(73) Assignee: The Curators of the University of Missouri, Columbia, MO (US)

( * ) Notice: Subject to any disclaimer, the term of this patent is extended or adjusted under 35 U.S.C. 154(b) by 813 days.

(21) Appl. No.: 12/899,024

(22) Filed: Oct. 6, 2010

(65) Prior Publication Data

US 2011/0079719 A1 Apr. 7, 2011

Related U.S. Application Data

(60) Provisional application No. 61/278,351, filed on Oct. 6, 2009, provisional application No. 61/342,134, filed on Apr. 8, 2010.

(51) Int. Cl.
*G01B 9/02* (2006.01)
*G01J 3/45* (2006.01)
*G01J 3/453* (2006.01)

(52) U.S. Cl.
CPC .................................... *G01J 3/4535* (2013.01)
USPC ...................... 356/451; 250/339.08

(58) Field of Classification Search
USPC ............... 356/451–456; 250/339.08
See application file for complete search history.

(56) References Cited

U.S. PATENT DOCUMENTS

| | | |
|---|---|---|
| 3,565,567 A | 2/1971 | Rains |
| 3,833,864 A | 9/1974 | Kiess et al. |
| 3,972,617 A | 8/1976 | Shibata et al. |
| 4,209,232 A | 6/1980 | Chernin |
| 4,312,593 A | 1/1982 | Baker et al. |
| 4,586,026 A | 4/1986 | Braig et al. |
| 4,694,174 A | 9/1987 | Erath |
| 4,848,904 A | 7/1989 | Sapp et al. |
| 4,891,526 A | 1/1990 | Reeds |
| 4,999,498 A | 3/1991 | Hunt et al. |
| 5,251,008 A | 10/1993 | Masutani |
| 5,473,162 A | 12/1995 | Busch et al. |
| 5,640,014 A | 6/1997 | Sauke et al. |
| 5,745,243 A | 4/1998 | Wilcox et al. |
| 5,994,700 A | 11/1999 | Rajic et al. |
| 6,734,965 B2 | 5/2004 | Talley et al. |
| 6,741,348 B2 | 5/2004 | Larsen et al. |
| 6,815,702 B2 | 11/2004 | Kiermeier et al. |
| 6,952,010 B2 | 10/2005 | Nizani |
| 7,262,844 B2 | 8/2007 | Larsen et al. |

(Continued)

FOREIGN PATENT DOCUMENTS

JP 04-006445 10/1992
JP 9292282 A 11/1997

OTHER PUBLICATIONS

Notification of Transmittal of The International Search Report and the Written Opinion of the International Searching Authority in International Application No. PCT/US2010/051601, dated Nov. 29, 2010, 10 pgs.

(Continued)

*Primary Examiner* — Hwa Lee
(74) *Attorney, Agent, or Firm* — Senniger Powers LLP

(57) ABSTRACT

A Fourier Transfer Infrared (FTIR) spectrophotometer having reduced baseline noise. The system and method include internal or external optical adapters having a moveable beamsplitter for splitting the source light beam into a reference beam and a sample beam, and may include a variable bandpass filter, variable preamplifier and reversed biased photodiodes.

18 Claims, 5 Drawing Sheets

(56) References Cited

U.S. PATENT DOCUMENTS

| | | |
|---|---|---|
| 7,268,881 B2 | 9/2007 | Larsen et al. |
| 8,593,637 B2 | 11/2013 | Folkenberg et al. |
| 2003/0202179 A1 | 10/2003 | Larsen et al. |
| 2006/0152726 A1 | 7/2006 | Larsen et al. |
| 2007/0291255 A1 | 12/2007 | Larsen et al. |
| 2008/0159755 A1 | 7/2008 | Hakomori |
| 2008/0204719 A1 | 8/2008 | Trainer |
| 2009/0079964 A1 | 3/2009 | Xu |
| 2009/0105565 A1 | 4/2009 | Xu |
| 2009/0116017 A1 | 5/2009 | Xu et al. |

OTHER PUBLICATIONS

Notification of Transmittal of The International Search Report and the Written Opinion of the International Searching Authority in International Application No. PCT/US2010/051638, dated Nov. 30, 2010, 11 pgs.

Shen, S., "The Performance of a Double-Beam Fourier Transform Spectrometer and Its Application to the Measurement of Weak i.r. Absorption," Infrared Physics, vol. 20, pp. 277-286 (1980).

EXTERNAL/INTERNAL OPTICAL ADAPTER WITH REVERSE BIASED PHOTODIODES FOR FTIR SPECTROPHOTOMETRY

BACKGROUND OF THE INVENTION

The present invention relates to Fourier Transfer Infrared (FTIR) spectrophotometer, more specifically, to devices capable of reducing the baseline noise of FTIR spectrophotometer. The present invention relates to U.S. Published Patent Application 20070291255, Ser. No. 11/845,580, filed Aug. 27, 2007, the disclosure of which is incorporated herein by reference in its entirety.

A fundamental property of a sample, be it gas, liquid or solid, is its tendency (or lack of tendency) to affect light at certain wavelengths. Characterization of the tendency of a sample to absorb, scatter, or transmit light is the basis for spectrophotometry. Exemplary applications of spectrophotometry include chemical and biological sample analysis. Other exemplary applications include manufactured product testing and the testing of air or water quality.

One significant aspect of any application of quantitative spectrophotometry is the ability to numerically characterize a sample. Thus, quantitative spectrophotometry reveals sample properties and allows one sample to be differentiated from another. In particular, aspects of spectrophotometry are often applied to determine optical spectra for samples in order to generally characterize and distinguish the samples. For example, aspects of spectrophotometry may be used to determine an absorption spectrum and/or a transmittance spectrum of a sample for identifying the sample or differentiating it from another sample. A sample's absorption spectrum indicates the fraction of light absorbed by the sample for a particular range of wavelengths. A sample's transmittance spectrum indicates the faction of light which passes through the sample for a particular range of wavelengths. The range of wavelengths may include one or more of the following ranges of light: ultraviolet (UV), visible, and infrared (IR).

Two general methods by which optical spectra, such as absorption and transmittance spectra, are obtained are (i) dispersive scanning (hereinafter referred to as "DS") and (ii) Fourier Transform (hereinafter referred to as "FT"). Both methods include facilitating an interaction between a sample light beam and a sample and detecting light (e.g., transmitted light, reflected light, scattered light) resulting from the interaction. Similarly, both methods include facilitating an interaction between a light beam and a reference or a sample, and detecting light (e.g., transmitted light, reflected light, scattered light) resulting from the interaction. For both methods, an optical spectrum is obtained from the ratio of the detected light for the sample to the detected light for the reference. According to the DS method, the sample light beam and the reference light beam each contain light having one particular wavelength (or a very narrow waveband) referred to as, monochromatic light. Thus, to obtain an optical spectrum, the DS method includes selecting the particular wavelength (or very narrow waveband) from a wavelength range, facilitating the sample and reference interactions with light, detecting the resulting light, and repeating the process for each particular wavelength in the wavelength range.

According to the FT method, however, the sample light beam and the reference light beam contain light having a plurality of wavelengths (e.g., polychromatic light). To obtain an optical spectrum, the FT method includes modulating the sample light beam and the reference light beam, facilitating the sample and reference interactions with light, detecting the resulting light, and applying Fourier Transform techniques to the detected light. The FT method, instrumentation, and operation thereof are described in further detail below.

In general, the DS method and the FT method can be applied to the entire light spectrum (e.g., electromagnetic spectrum). However, the FT method is generally preferable to the DS method for infrared and near infrared applications because it produces substantially enhanced signal to noise ratios with respect to DS methodology. Additionally, since the FT method obtains the optical spectrum from exposing the sample and reference to only one light beam, rather than a plurality of light beams, the optical spectrum is generally obtained in a substantially shorter time using the FT method rather than the DS method. Thus, the FT method is often more desirable than the DS method when spectra must be obtained quickly or when certain physical features of the sample must be enhanced.

Irrespective of whether optical spectra are obtained using the DS method or the FT method, sensitivity, precision, and accuracy of the spectrophotometric measurements are critical. The sensitivity of a spectrophotometric measurement directly relates to the ability to detect small differences between samples having similar absorption properties. The greater the sensitivity, the smaller the difference that can be detected. The precision of a spectrophotometric measurement may be considered as a function of the ability to repeat the same measurement for an identical sample at different times. The accuracy of a spectrophotometric measurement may be considered as a function of the ability to correctly determine the numerical measure of the sample composition. The latter is critical, for example, when attempting to quantify an unknown element in a sample. Over a given range of concentration, the quantification is characterized by certain levels of precision and accuracy. However, below some critical lower limit of the concentration range, both precision and accuracy are adversely affected. This lower limit is the detection limit of the particular spectrophotometric instrument. As sensitivity increases, the detection limit decreases. Improvements in sensitivity, while retaining high levels of precision and accuracy are desirable.

For example, in FT methods, fluctuations in the light source power cause noise in the signal generated by the detector. The noise is ultimately carried through to the optical spectrum (e.g., transmittance spectrum). Additionally or alternatively, in FT methods, the various noises include digitization errors and tracking errors. In particular, digitization errors are a result of the finite resolution of the digitizer (i.e., electronics module, such as, analog to digital converter) limiting the ability of the digitizer to digitize signals generated by the detector with sufficient precision to indicate relatively small absorption peaks. This noise is introduced into the electronic signal at the stage of analog to digital conversion. Tracking errors are a result of the inconsistent sampling associated with the timing of the modulations introduced into the input light beam by an interferometer. The noise is ultimately carried through to the optical spectrum (e.g., transmittance spectrum). Such noise sources have traditionally not been considered in conventional devices that were incapable of providing the sensitivity required to make such sources apparent.

SUMMARY OF THE INVENTION

The invention describes a new device capable of reducing the baseline noise of Fourier transfer Infrared (FTIR) spectrophotometer by about 50 to 100 folds, and thus increase the signal-to-noise (S/N) ratio of FTIR spectrophotometer by about 50 to 100 times. In one aspect of the invention, an optical adapter external to FTIR spectrophotometer is described. In another aspect of the invention, an optical adapter which can be part of commercial FTIR spectrophotometers or can be retrofitted into the sample compartment of most commercial FTIR spectrophotometers is described.

In one form, the invention includes a method of determining an optical spectrum for a sample substance relative to a reference substance. The method is for use with a spectrophotometry system having a light source generating a source light beam of coherent light. The source beam is split into a reference beam and a sample beam by using a beamsplitter. The reference beam is directed into a reference cell having a substance therein. The substance in the reference cell interacts with the reference beam to yield an output reference beam having a direction. The sample beam is directed into a sample cell having a substance therein. The substance in the sample cell interacts with the sample beam to yield an output sample beam having a direction. At least a portion of the output reference beam and at least a portion of the output sample beam are detected by biased photodiodes. As a result, a biased reference signal representative of the detected portion of the output reference beam and a biased sample signal representative of the detected portion of the output sample beam are generated. A difference signal proportional to the difference between the reference signal and the sample signal is also generated. Thereafter, the method includes:
1) placing the reference substance in the reference cell and in the sample cell;
2) determining a reference spectrum of the reference substance based on the difference signal;
3) moving the beamsplitter in a direction perpendicular to the propagation of the source beam to determine a minimized noise location of the beamsplitter at which a center burst of an interferogram is minimized;
4) determining a baseline difference spectrum;
5) placing the beamsplitter at the determined minimized noise location;
6) thereafter placing the reference substance in the reference cell and placing the sample substance in the sample cell;
7) determining a sample difference spectrum; and
8) determining the absorption spectrum of the sample based on the reference spectrum, the baseline difference spectrum, and the sample difference spectrum.

In another form, the invention comprises an adapter for use with an FTIR spectrophotometry system having a light source generating a source light beam of coherent light. A sealed housing receives the source light beam and an optical system within the housing includes a moveable beamsplitter for splitting the source light beam into a reference beam directed in a first path and a sample beam directed in a second path different from the first path. The beamsplitter is moveable between the first and second paths. A reference cell within the housing includes a reference for interacting with the reference beam to yield an output reference beam having a direction. A reference light biased photodetector detects at least a portion of the output reference beam based on the direction of the output reference beam and generates a reference signal representative of the detected light. A sample cell within the housing includes a sample for interacting with the sample beam to yield an output sample beam having a direction. A sample light biased photodetector detects at least a portion of the output sample beam based on the direction of the output sample beam and generates a sample signal representative of the detected light. A detector circuit produces a difference signal proportional to the difference between the reference signal and the sample signal. A processor is configured to determine a spectrum of the sample based on the difference signal.

In another form, the invention comprises a spectrophotometry system including a light source generating a light beam and a lens in a path of the light beam and transmitting the light beam as a coherent source light beam. An optical system includes a moveable beamsplitter for splitting the source light beam into a reference beam directed in a first path and a sample beam directed in a second path different from the first path. The beamsplitter is moveable between the first and second paths. A reference cell includes a reference for interacting with the reference beam to yield an output reference beam having a direction. A reference light biased photodetector detects at least a portion of the output reference beam based on the direction of the output reference beam and generates a reference signal representative of the detected light. A sample cell includes a sample for interacting with the sample beam to yield an output sample beam having a direction. A sample light biased photodetector detects at least a portion of the output sample beam based on the direction of the output sample beam and generates a sample signal representative of the detected light. A detector circuit produces a difference signal proportional to the difference between the reference signal and the sample signal. A processor is configured to determine a spectrum of the sample based on the difference signal.

DETAIL DESCRIPTION

Embodiments of the invention provide an external/internal adapter for the existing FTIR spectrophotometers to reduce the baseline noise and increase the signal-to-noise ration of the spectrophotometers. The adapters improve both qualitative and quantitative analytical capability in a broad range of chemical, biological, medical and other applications. For example, the adapters may be employed in the FTIR spectrophotometers used in the drug discovery and development process to significantly reduce the time needed for identifying an efficient drug. The adapters may be used in clinical research and diagnostics to lead to more accurate and faster diagnosis, especially in early stage disease detections. The adapters may also be used in fundamental research in universities and research laboratories. The new devices can enable scientists to study phenomena that could not be previously observed, which may lead to a better molecular level understanding of many physical, chemical, and biological processes.

Figure 1:
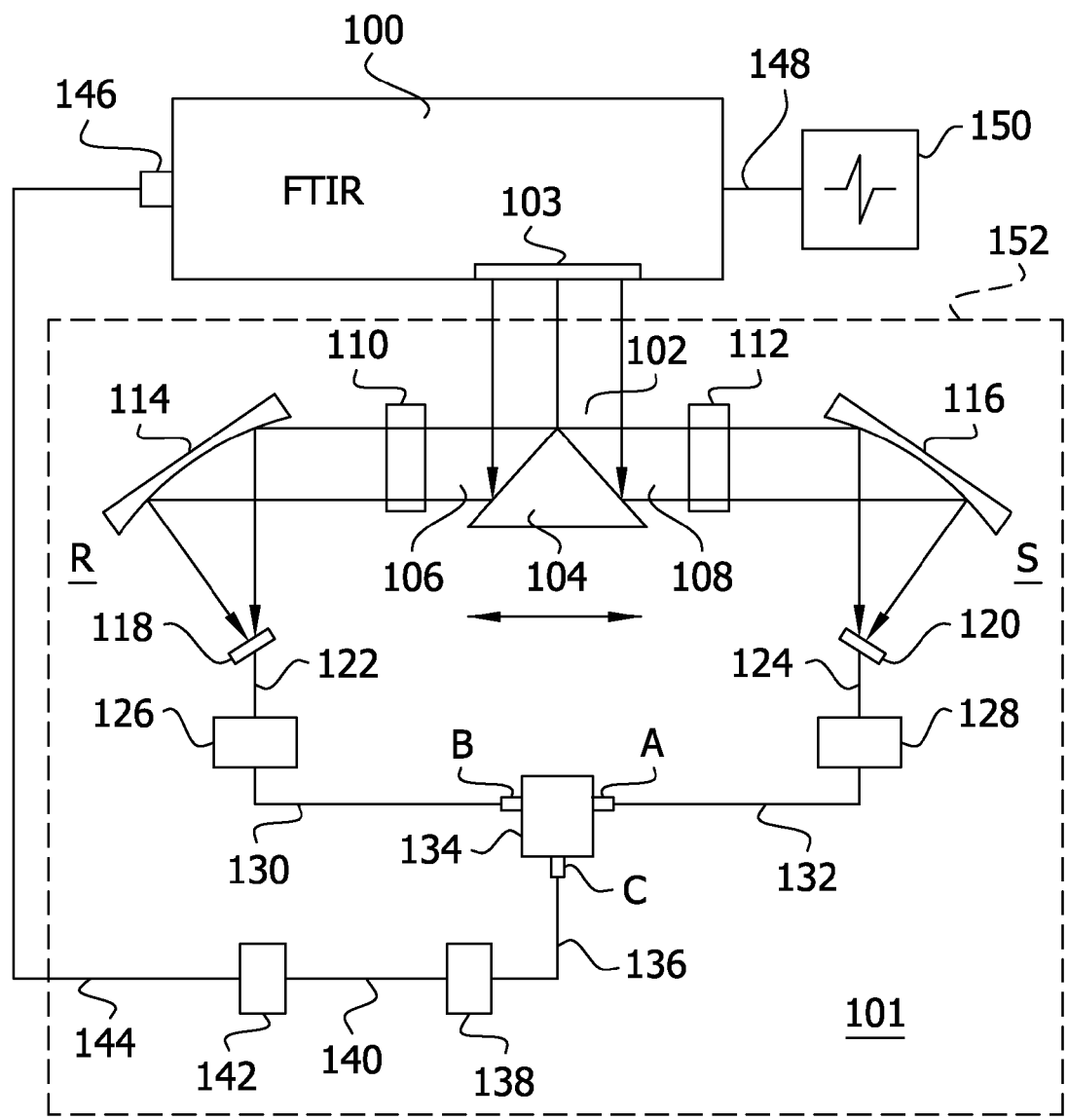
FIG. 1 shows the optical layout and electronics configuration of the first exemplary external adapter, according to one embodiment of the invention.

Referring to FIG. 1, an optical layout and electronics configuration of an exemplary external adapter according to one embodiment of the invention is illustrated. As shown in FIG. 1, an FTIR spectrophotometer 100 with an exemplary external adaptor 101 has an external beam option that sends a collimated external IR beam 102 out of a FTIR spectrophotometer 100 through an exit port 103. The external IR beam 102 is split by a beamsplitter 104 into a reference beam 106 on a reference side R of the beamsplitter 104 and a sample beam 108 on a sample side S of the beamsplitter 104. The beamsplitter 104 is moveable along a linear path perpendicular to the beam 102 along the path of the beams 106, 108, as indicated by the double-headed arrow, to minimize noise as noted herein. In one embodiment, the two reflective surfaces of the beamsplitter 104 are coated with a protective gold layer to provide a uniform reflectivity in the entire infrared region from 700 nm to 10 μm. The reference beam 106, after passing through a reference cell 110, is reflected and focused by a concave mirror 114, and collected by reference detector 118. The sample beam 108, after passing through a sample cell 112, is reflected and focused by a concave mirror 116, and collected by sample detector 120. To achieve more accurate results, matched optical cells 110 and 112 may be used and matched IR detectors 118 and 120 may be used. By moving the beamsplitter 104 along the linear path perpendicular to the beam 102 along the path of the beams 106, 108 and between the mirrors 114, 116 with a reference in both the reference cell 110 and the sample cell 112, the position of the beamsplitter 104 relative to the mirrors 106, 108 and relative to the collimated external IR beam 102 is varied to determine a position at which the center burst of the waveform of the interferogram is minimized.

A reference photocurrent 122 from the reference detector 118 is provided to a low-noise reference preamplifier 126 where the reference photocurrent 122 is converted into a reference voltage 130. A sample photocurrent 124 from the sample detector 120 is sent to a low-noise sample preamplifier 128 where the sample photocurrent 124 is converted into a sample voltage 132.

The reference voltage signal 130 is sent to an input channel B of an electronic device 134. The sample voltage signal 132 is sent to an input channel A of the electronics device 134.

The electronic device 134 is a selective combining circuit which selectively sends the following voltage signals to its output channel C:

C=A; sample voltage signal 132;
C=B; reference voltage signal 130; or
C=B−A; differential voltage signal 136 of the two input ports.

For example, device 134 may be SIM911 from Stanford Research Systems. The output voltage signal 136 from the output channel C of electronic device 134 is send to a low-noise voltage amplifier 138 with variable gain, e.g., G=1 to G=100. The amplified voltage signal 140 from the voltage amplifier 138 is then sent to an electronic bandpass filter device 142 with variable band center (e.g., $f_o$=100 Hz to $f_o$=100 kHz) and variable bandwidth (e.g., Δf=10 Hz to Δf=1000 Hz). The voltage signal 144 from the electronic bandpass filter 142 is sent to an external detector input port 146 on the FTIR spectrophotometer 100. The processed signal 148 such as the center burst of the waveform of the interferogram will be displayed on a PC 150 that controls the operation of the FTIR spectrophotometer 100. In one embodiment, the optical adapter 101 is enclosed in a sealed box 152 to reduce light interference and vibration from the environment.

In summary, FIG. 1 illustrates one embodiment of the external adapter 101 for use with a spectrophotometry system 100 having a light source generating a source light beam 102 of coherent light. The adapter 101 is located within a sealed housing 152 for receiving the source light beam 102. An optical system within the housing 152 includes the moveable beamsplitter 104 for splitting the source light beam 102 into the reference beam 106 directed in the first reference path R and the sample beam 108 directed in the second sample path S, different from the first path. The beamsplitter 104 is moveable between the first and second paths to minimize noise, as noted herein. The reference cell 110 within the housing includes the reference for interacting with the reference beam 106 to yield the output reference beam having a direction. The reference light detector 118 detects at least the portion of the output reference beam based on the direction of the output reference beam and generates the reference signal 122 representative of the detected light passing through the reference cell 110 and interacting with the reference within the cell. The sample cell 112 is also within the housing and includes the sample for interacting with the sample beam 108 to yield an output sample beam having a direction. The sample light detector 120 detects at least the portion of the output sample beam based on the direction of the output sample beam and generates the sample signal 124 representative of the detected light. A detector circuit including the selectively combining electronic device 134 selectively produces the reference voltage 130 proportional to the reference signal 122 after amplification by the preamplifier 126. The electronic device 134 also produces the difference voltage 136 proportional to the difference between the reference voltage 130 and the sample voltage 132 after amplification by the preamplifiers 126, 128. When the difference voltage 136 is indicative of an interferogram of a reference in both the reference cell 110 and the sample cell 112, the beamsplitter 104 moves along the first and second paths to a determine a position of increased noise cancellation and increased signal to noise ratio of the difference signal 136. When the difference voltage 136 is indicative of an interferogram of a reference in the reference cell 110 and a sample in the sample cell 112 and the beamsplitter 104 is in its noise minimizing position, a processor such as personal computer (PC) 150 is configured to determine the spectrum of the sample based on the difference voltage 136. Optionally, the adapter may include the variable gain amplifier 138 between the detector circuit and the processor 150.

Figure 2:
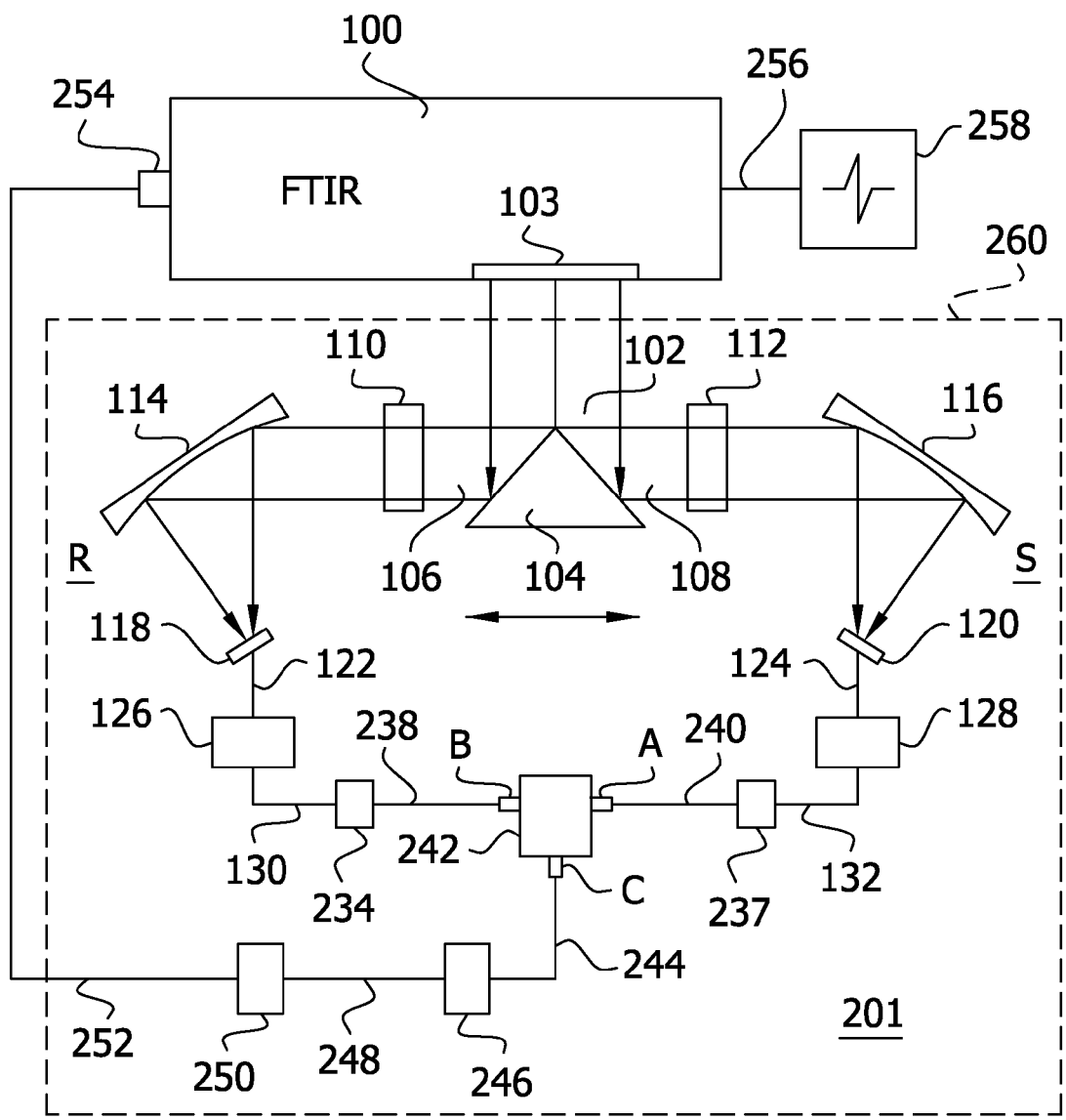
FIG. 2 shows the optical layout and electronics configuration of an alternative external adapter based on voltage cancelation.

Referring to FIG. 2, an optical layout and electronics configuration of an embodiment of an adapter based on voltage cancelation is illustrated. Similar to FIG. 1, FIG. 2 illustrates the FTIR spectrophotometer 100 with an exemplary external adaptor 201 has an external beam option that sends a collimated external IR beam 102 out of a spectrophotometer of the FTIR spectrophotometer 100 through an exit port 103. The external IR beam 102 is split by a beamsplitter 104 into a reference beam 106 on a reference side R of the beamsplitter 104 and a sample beam 108 on a sample side S of the beamsplitter 104. The beamsplitter 104 is moveable along a path perpendicular to the beam 102 along the path of the beams 106, 108, as indicated by the double-headed arrow, to minimize noise as noted herein. In one embodiment, the two reflective surfaces of the beamsplitter 104 are coated with a protective gold layer to provide a uniform reflectivity in the entire infrared region from 700 nm to 10 μm. The reference beam 106, after passing through a reference cell 110, is reflected and focused by a concave mirror 114, and collected by reference detector 118. The sample beam 108, after passing through a sample cell 112, is reflected and focused by a concave mirror 116, and collected by sample detector 120. To achieve more accurate results, matched optical cells 110 and 112 may be used and matched IR detectors 118 and 120 may be used.

A reference photocurrent 122 from the reference detector 118 is provided to a low-noise reference preamplifier 126 where the reference photocurrent 122 is converted into a reference voltage 130. A sample photocurrent 124 from the sample detector 120 is sent to a low-noise sample preamplifier 128 where the sample photocurrent 124 is converted into a sample voltage 132.

The reference voltage signal 130 is sent to a phase delay device 234, and an output voltage signal 238 from the phase delay device 234 is sent to the input channel B of the electronic device 242. In one embodiment, the phase delay may be implemented by adjusting the phases of the waveforms via an oscilloscope. The sample voltage signal 132 is sent to a phase delay device 237, and an output voltage signal 240 from the phase delay device 237 is sent to an input channel A of the electronic device 242. As a result, the phase delay devices 234, 237 adjust the phases of the voltage signals 238 and 240 to have identical phases.

The output voltage signal 244 from an output channel C of the electronic device 242 can be one of the followings:

C=A: Voltage signal 244 is identical to the reference voltage signal 238;
C=B: Voltage signal 244 is identical to the sample voltage signal 240; or
C=B−A: Voltage signal 244 is identical to a differential voltage signal between the voltage signal 240 at the input channel A and the voltage signal 238 at the input channel B of the electronic device 242.

The output voltage signal 244 from the output channel C of electronic device 242 is sent to a low-noise voltage amplifier 246 with variable gain, e.g., G=1 to G=100. The amplified voltage signal 248 from the voltage amplifier 246 is then sent to an electronic bandpass filter 250 with variable band center (e.g., $f_0$=100 Hz to $f_0$=100 kHz) and variable bandwidth (e.g., $\Delta f$=10 Hz to $\Delta f$=1000 Hz). The voltage signal 252 from the electronic bandpass filter 250 is sent to an external detector input port 254 on the FTIR spectrophotometer 100. The processed signal 256 such as the center burst of the interferogram will be displayed on a PC 258 that controls the operation of the FTIR spectrophotometer 100. In one embodiment, the optical adapter 101 may be enclosed in a sealed box 260 to reduce light interference and vibration from the environment.

One reason for including the phase shifters such as phase delay devices 234 and 237 is to provide flexibility to accommodate off the shelf components. For example, for devices which operate in certain IR wavelength regions, most IR detection module available for purchase are modules in which an IR detector is coupled with a preamplifier. The output of these IR detection modules is a voltage. However, two similar IR detection modules may have different electronic bandwidths and rise time. As a result, the two signals 130 and 132 in FIG. 1 may be out of phase to a certain extent at switching device 134. This out of phase condition could minimize cancellation and in some configurations, a high degree of cancellation cannot be reached at point C.

The phase delay device 234, 237 shift the phase signals 130 and 236 to have the identical phase needed for high degree of cancellation at switching device 242.

In summary, FIG. 2 illustrates one embodiment of the external adapter 201 for use with a spectrophotometry system 100 having a light source generating a source light beam 102 of coherent light. As noted above, one feature of FIG. 2 not illustrated in FIG. 1 is the first phase shifting device 234 for shifting the phase of the reference signal 130 and the second phase shifting device 237 for shifting the phase of the sample signal 132. The detector circuit produces a reference voltage 238 proportional to the phase shifted reference signal and a difference voltage 244 proportional to the difference between the phase shifted reference signal and the phase shifted sample signal.

Referring to FIGS. 1 and 2, the following describes an exemplary method of operation of the above-described embodiments illustrated wherein the external adapters 101 and 201 is used in liquid phase detection:

(1) A reference solvent is placed in both the reference cell 110 and the sample cell 112. The electronic device 134, 242 is set to send differential voltage B−A to channel C. The amplitude of the center burst of the waveform of the interferogram displayed on PC 150 is minimized by moving the beamsplitter 104 in the direction perpendicular to the propagation direction of the IR beam 102 (as shown by the double headed arrow in FIGS. 1 and 2). In one embodiment, the beamsplitter 104 is mechanically moved slowly and linearly to determine a location of the beamsplitter 104 at which the center burst is minimized. A relatively high gain value, e.g., G=10 to 100, may be used on the voltage amplifier 138, 246 during this process. Once the minimizing location of the beamsplitter 104 is determined, it is positioned at the determined minimizing location to minimize the center burst of the interferogram. As a result, the reference signal 130 and the sample signal 132 are balanced, and at least some of if not all of the source noise is cancelled in the differential signal 136, 244. At this point, the spectrophotometer has been calibrated to minimize source noise.

(2) After the magnitude of the center burst is minimized, a baseline difference spectrum $D_R=(B_R-A_R)G_R$ is measured, where $B_R$ represents the reference voltage signal 130 corresponding to the reference solvent in the reference cell 110, and $A_R$ represents the sample voltage signal 132 corresponding to reference solvent in the sample cell 112. $G_R$ is the baseline gain value selected for the voltage amplifier 138, 246 during the previous step, e.g., $G_R$=10 to 100.

(3) The reference spectrum R=$B_R$ is determined by setting the electric device 134, 242 to only transmit the reference voltage 130, 238 at channel B to channel C. A gain of G=1 on the voltage amplifier 138, 246 is used during this process to determine the reference spectrum. (4) The reference solvent in the sample cell 112 is replaced with a sample solution to be characterized. The sample difference spectrum $D_S=(B_R-A_S)G_S$ is determined, where $A_S$ represents the sample voltage signal 132, 240 corresponding to sample solution in the sample cell 112. The sample gain value $G_S$ on the voltage amplifier 138, 246 should be the same as or close to the baseline gain $G_R$, e.g., $G_S$=10 to 100.

Transmittance (T) and Absorbance (Abs) of the sample can be calculated as a function of the sample difference spectrum $D_S$, the baseline difference spectrum $D_R$, the reference spectrum R, the sample gain value $G_S$, and the baseline gain value $G_R$, using the following equations:

$$T = \frac{1 - D_S/G_S/R}{1 - D_R/G_R/R} \quad \text{Abs} = -\log T$$

In FIGS. 1 and 2, the settings of the variable bandwidth and the band center of the electronic bandpass filter 142, 250 depend on the following factors:
(1) Center wavelength (e.g., the peak wavelength) of the optical absorption band,
(2) The full width at half maximum (FWHM) bandwidth of the optical absorption band, and
(3) The speed at which the moving mirror of the FTIR spectrophotometer travels.

For example, a near infra-red (NIR) band is centered at $\tilde{v}_0=10,000$ cm$^{-1}$ ($\lambda_0=1000$ nm), and has an optical bandwidth (FWHM) of $\Delta\tilde{v}_0=4$ cm$^{-1}$. Assuming the moving mirror speed of the FTIR spectrophotometer is V=0.25 cm/s, the center frequency of electronic bandpass filter 142, 250 should be set at $f_0=2V\Delta\tilde{v}_0=5$ kHz. The FWHM optical bandwidth translates into an electronic bandwidth of $2V\Delta\tilde{v}=2$ Hz. As such, the bandwidth of the electronic bandpass filter 142, 250 should be wide enough to allow the entire band region interested to be displayed without distortion.

Although a larger $\Delta f$ may be desirable for displaying a larger spectral region, the overall baseline noise is proportional to the square root of $\Delta f$. Considering the above, a balanced choice should be selected.

In summary, FIGS. 1 & 2 illustrate one embodiment of the method of operation of the external adapter 101 for use with a spectrophotometry system 100 having a light source generating a source light beam 102 of collimated, coherent light. The method determines an optical spectrum for the sample substance relative to the reference substance. The method is for use with a spectrophotometry system 100 providing the light source generating the source light beam of collimated, coherent light 102. The method comprises:
1) splitting by using the beamsplitter 104 the source beam 102 into the reference beam 106 and the sample beam 108;
2) directing the reference beam 106 into the reference cell 110 having a substance therein, said substance in the reference cell 110 interacting with the reference beam 106, said interacting yielding an output reference beam having a direction;
3) directing the sample beam 108 into the sample cell 112 having a substance therein, said substance in the sample cell 112 interacting with the sample beam 108, said interacting yielding an output sample beam having a direction;
4) detecting (such as by detectors 118, 120) at least the portion of the output reference beam and at least the portion of the output sample beam;
5) generating the reference signal 122 representative of the detected portion of the output reference beam and the sample signal 124 representative of the detected portion of the output sample beam;
6) generating the reference voltage 130 proportional to the reference signal and the difference voltage 136, 244 proportional to the difference between the reference signal 122 and the sample signal 124;
7) placing the reference substance in the reference cell 110 and in the sample cell 112;
8) moving the beamsplitter 104 in the direction perpendicular to the propagation of the source beam 102 so that the beamsplitter 104 is positioned to minimize the amplitude of center burst in the interferogram when a reference is in both the reference cell 110 and the sample cell 112 to thereby minimize source noise in the differential signal B−A;
9) determining a baseline difference spectrum based on the difference voltage 136, 244 with the reference substance placed in the reference cell 110 and the sample cell 112;
10) determining the spectrum of the reference by sending only the reference signal in channel B to channel C;
11) thereafter placing the reference substance in the reference cell 110 and placing the sample substance in the sample cell 112; and
12) determining the sample difference spectrum based on the difference voltage 136, 244 with the reference substance placed in the reference cell 110 and the sample substance placed in the sample cell 112.

In summary, the method of FIG. 2 also includes using the first phase shifting device 234 for shifting the phase of the reference signal 130, using the second phase shifting device 237 for shifting the phase of the sample signal 132, producing the reference voltage 238 proportional to the phase shifted reference signal and producing the difference voltage 244 proportional to the difference between the phase shifted reference signal 238 and the phase shifted sample signal 240.

Figure 3:
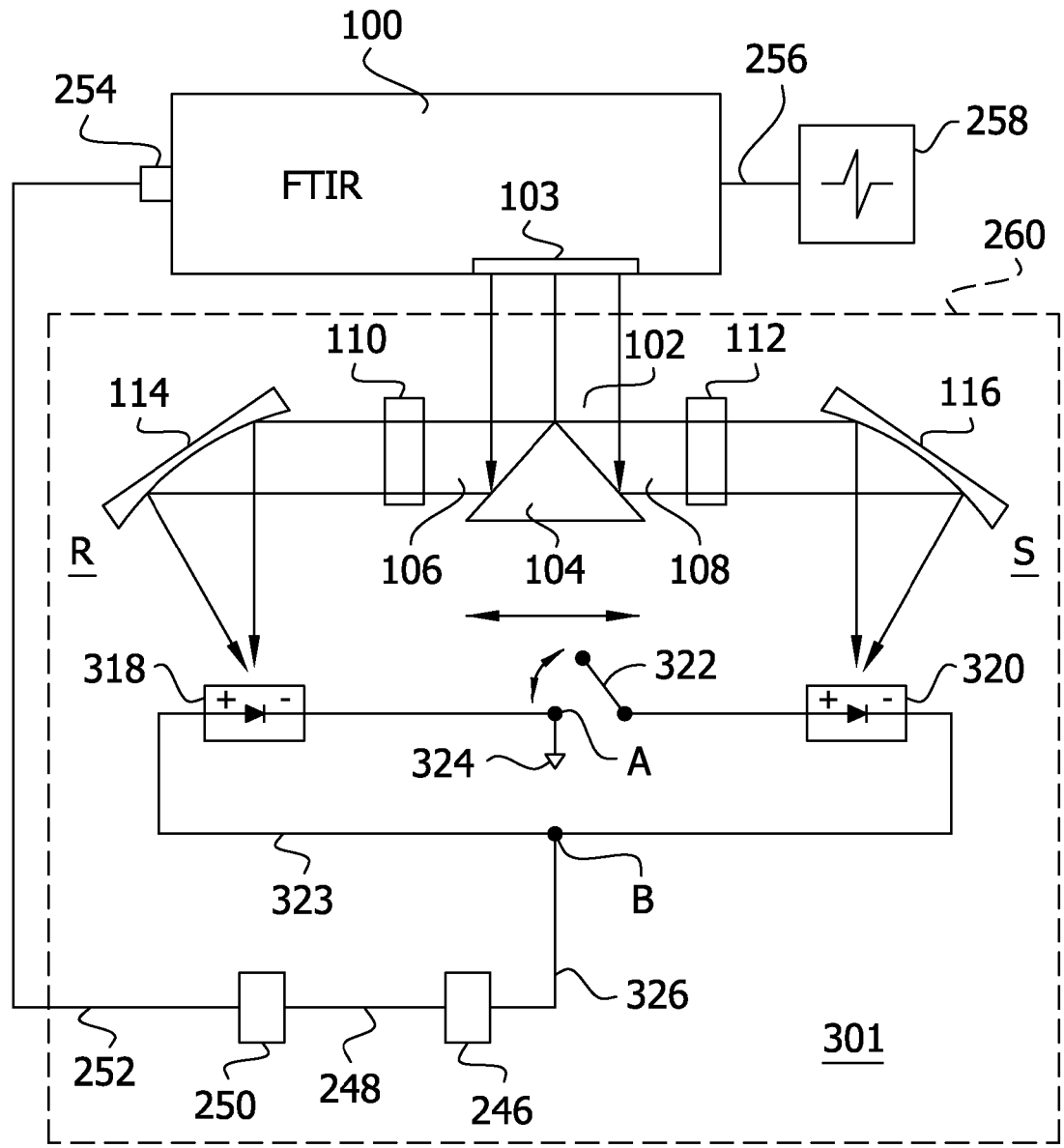
FIG. 3 shows the optical layout and electronics configuration of an external adapter according to another embodiment of the invention.

Referring to FIG. 3, another embodiment of an exemplary external adapter is illustrated. As shown in FIG. 3, the FTIR spectrophotometer 100 with a second exemplary external adaptor 301 has an external beam option that sends out a collimated IR beam 102 through an exit port 103. The external IR beam 102 is split by a beamsplitter 104 into a reference beam 106 on a reference side R of the beamsplitter 104 and a sample beam 108 on a sample side S of the beamsplitter 104. The beamsplitter 104 is moveable along a path perpendicular to the beam 102 along the path of the beams 106, 108, as indicated by the double-headed arrow, to minimize noise as noted herein. In one embodiment, the two reflective surfaces of the beamsplitter 104 are coated with protective gold layer to provide a uniform reflectivity in the entire infrared region from 700 nm to 10 µm. The reference beam 106, after passing through a reference cell 110, is reflected and focused by a concave mirror 114, and collected by a reference detector 318. The sample beam 108, after passing through a sample cell 112, is reflected and focused by a concave mirror 116, and collected by a sample detector 320. To achieve more accurate results, matched optical cells, 110 and 112, may be used and matched IR detectors, 318 and 320, may be used.

In one embodiment, the reference detector 318 and the sample detector 320 each comprise a photodiode having a cathode and an anode. The cathode (negative end) of the reference photodiode detector 318 is electrically connected to an electric ground 324 of the electronics of the system at point A. The anode (positive end) of the reference photodiode detector 318 is electrically connected to an output point B. The anode (positive end) of the sample photodiode detector 320 is electrically connected to a switch 322 which selectively connects to the ground point A to selectively ground the anode of the sample photodiode detector 320. The cathode (negative end) of the sample photodiode detector 320 is electrically connected to the output point B.

When the switch 322 is closed, the anode of sample photodiode detector 320 is electrically connected to the point A. The anode of the reference photodiode detector 318 is electrically connected to the cathode of the sample photodiode detector 320 at point B. The combined current signal 326 from point B is sent to a low-noise preamplifier 246.

The preamplifier 246 has different current-to-voltage conversion factors, e.g., 5 kΩ, 10 kΩ, 50 kΩ, 100 kΩ, and 500 kΩ. The output voltage signal 248 from the preamplifier 246 is sent to an electronic bandpass filter device 250 that has variable band center (e.g., $f_o=100$ Hz to $f_o=100$ kHz) and variable bandwidth (e.g., $\Delta f=10$ Hz to $\Delta f=1000$ Hz). The voltage signal 252 from the electronic bandpass filter 250 is sent to an external detector input port 254 of the FTIR spectrophotometer 100. The processed signal 256 such as the center burst of the interferogram will be displayed on a PC 258 that controls the operation of the FTIR spectrophotometer 100. In one embodiment, the optical adapter 301 is enclosed in a sealed box 260 to reduce light interference and vibration from the environment. The circuit is configured such that the reference voltage 248 is positive when the switch 322 is open (i.e., when the anode of the sample photodiode 320 is electrically open circuited and disconnected from the point A).

In summary, FIG. 3 illustrates one embodiment of the external adapter 301 for use with a spectrophotometry system 100 having a light source generating a source light beam 102 of collimated, coherent light. One feature of FIG. 3 not illustrated in FIGS. 1 and 2 is that the reference light detector comprises a reference photodiode 318 and the sample light detector comprises a sample photodiode 320. The switch 322 selectively electrically connects the grounded cathode of the reference photodiode 318 and the anode of the sample photodiode 320. The anode of the reference photodiode 318 is connected to the cathode of the sample photodiode 320 at the point B which provides the current signal 326, and amplifier 246 converts the current signal into the reference voltage (when the switch 322 is open) and the difference voltage (when the switch 322 is closed) 248. The amplifier 246 may have different current-to-voltage conversion factors.

Referring to FIG. 3, the following describes an exemplary operation of the above-described embodiment illustrated wherein the external adapter 301 is used in liquid phase detection:

(1) Switch 322 is closed to electrically connect and ground the anode of the sample detector 320 to point A, which is at ground potential 324.

(2) A reference solvent is placed in both the reference cell 110 and the sample cell 112. A relatively high baseline resistor value (e.g., 100 kΩ) to provide high gain may be used for the preamplifier 246 during this process. The amplitude of the FTIR center burst of the interferogram displayed on PC 258 is minimized by moving the beamsplitter 104 in the direction perpendicular to the propagation direction of the IR beam 102 (as shown by the double headed arrow in FIG. 3), thereby determining the position of the beamsplitter 104 at which noise is minimized, as noted herein. Once the minimizing location of the beamsplitter 104 is determined, it is positioned at the determined minimizing location to minimize the center burst. As a result, the reference channel R and the sample channel S are balanced, and at least some of if not all of the source noise is cancelled in the differential current signal 326. At this point, the spectrophotometer has been calibrated to minimize source noise.

(3) After the beamsplitter 104 is positioned to minimize the magnitude of the center burst, a baseline difference spectrum $V_B$ is measured. A relatively high gain baseline resistor value (e.g., $R_1$=100kΩ) on the preamplifier 246 is used during this baseline process.

(4) The anode of the sample photodiode 320 is then disconnected from point A by opening the switch 322 to disconnect the anode of the sample detector 320 from the cathode of the reference detector 318, which is grounded at point A. A reference spectrum $V_R$ is measured. A relatively low gain reference resistor value (e.g., $R_2$=5 kΩ) on the preamplifier 246 is used during this process.

(5) The reference solvent in the sample cell 116 is replaced with a sample solution to be characterized. Switch 322 is closed to electrically connect and ground the anode of the sample detector 320 to point A. The sample difference spectrum Vs is then recorded. A high gain sample resistor value (e.g., $R_3$=100 kΩ) on the preamplifier 246 is used during this process.

Transmittance (T) and Absorbance (A) can be calculated as a function of the sample difference spectrum Vs, the reference spectrum $V_R$, the baseline difference spectrum $V_B$, the high gain baseline resistor value $R_1$, the low gain reference resistor value $R_2$, and the high gain sample resistor value $R_3$, using the following equations:

$$T = \frac{1 - \frac{V_S/R_3}{V_R/R_2}}{1 - \frac{V_B/R_1}{V_R/R_2}} \quad \text{Abs} = -\log T$$

In summary, FIG. 3 illustrates one embodiment of the method of operation of the external adapter 301 for use with a spectrophotometry system 100 having a light source generating a source light beam 102 of collimated, coherent light. The method also uses a reference photodiode 318 to detect at least a portion of the output reference beam and uses a sample photodiode 320 to detect at least a portion of the output sample beam. The switch 322 selectively electrically connects the grounded cathode of the reference photodiode 318 and the anode of the sample photodiode 320. The anode of the reference photodiode 318 is connected to the cathode of the sample photodiode 320 at the point B which provides a current signal. The preamplifier 246 converts the current signal into the reference voltage (when the switch 322 is open) and the difference voltage (when the switch 322 is closed) 248. The method determines the reference spectrum $V_R$ when the switch 322 is open. The spectrum of the sample substance is based on the determined baseline difference spectrum $V_B$, determined sample difference spectrum $V_S$, and the determined reference spectrum $V_R$. The method employs the preamplifier 246 with a variable current-to-voltage conversion factor. A higher gain factor is used to determine a baseline difference spectrum $V_B$ and a sample difference spectrum $V_S$, and a lower gain factor is used to determine a reference spectrum $V_R$. Once difference between the method of operation of embodiment of FIGS. 1-2 and embodiment of FIG. 3 is that the embodiment of FIG. 3 includes biased photodiodes 318 and 320 which provide biased reference and sample signals at point B.

Figure 4:
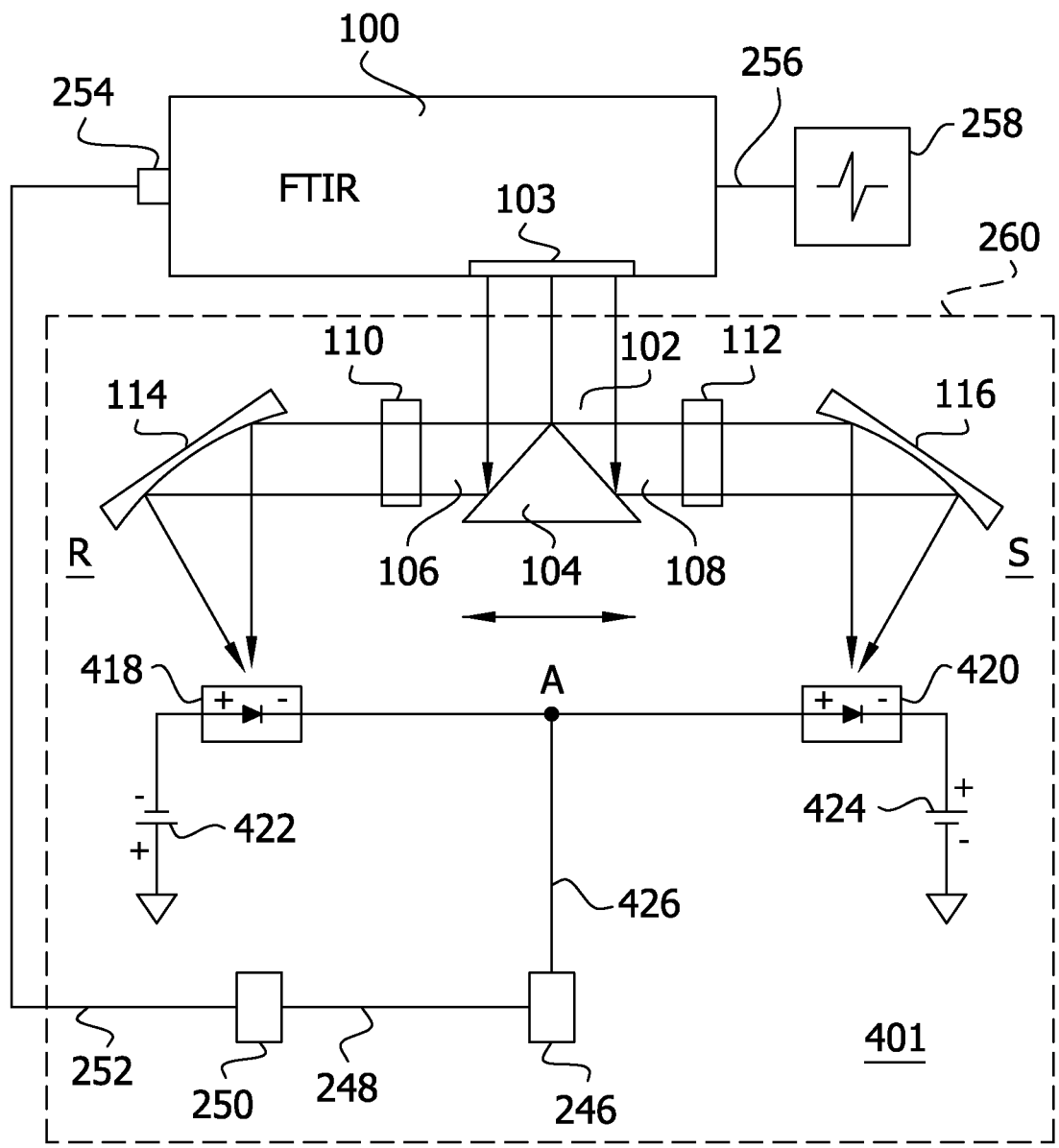
FIG. 4 shows the optical layout and electronics configuration of an external adapter according to another embodiment of the invention.

Referring to FIG. 4, the optical layout and electronics configuration of an exemplary external adapter according to one embodiment of the invention. As shown in FIG. 4, FTIR spectrophotometer 100 has an external beam option that sends out a collimated IR beam 102 through an exit port 103. The external IR beam 102 is split by a beamsplitter 104 into a reference beam 106 on a reference side R of the beamsplitter 104 and a sample beam 108 on a sample side S of the beamsplitter 104. The beamsplitter 104 is moveable along a path perpendicular to the beam 102 along the path of the beams 106, 108, as indicated by the double-headed arrow, to minimize noise as noted herein. The two reflective surface of the beamsplitter 104 should be coated with identical reflecting layers for consistent beam splitting. The reference beam 106, after passing through a reference cell 110, is reflected and focused by a concave mirror 114, and collected by a reference photodiode detector 418. The sample beam 108, after passing through a sample cell 112, is reflected and focused by a concave mirror 116, and collected by a sample photodiode detector 420. To achieve best result, one should use matched optical cells, 110 and 112, and matched IR detectors, 418 and 420. The negative end (cathode) of the reference photodiode detector 418 is electrically connected to the positive end (anode) of sample photodiode detector 420 at point A. The positive end (anode) of the reference photodiode detector 418 is connected to the negative terminal of a battery 422. The positive terminal of the battery 422 is connected to the electrical ground of the detection system. Thus, the reference photodiode detector 418 is reversely biased. The negative end of the sample photodiode detector 420 is connected to the positive terminal of a battery 424. The negative terminal of the battery 424 is connected to the electrical ground of the detection system. Thus, the reference photodiode detector 420 is also reversely biased. The voltage of the battery 422 is identical to that of the battery 424. Differential current signal 426 from the point A is sent to a low-noise preamplifier 246 at which the current signal 426 is converted into a voltage signal 248.

The preamplifier 246 has different current-to-voltage conversion factors, e.g., 5 kΩ, 10 kΩ, 50 kΩ, 100 kΩ, and 500 kΩ. The output voltage signal 248 from the preamplifier 246 is sent to an electronic bandpass filter device 250 that has variable band center (e.g., $f_o$=100 Hz to $f_o$=100 kHz) and variable bandwidth (e.g., Δf=10 Hz to Δf=1000 Hz). The voltage signal 252 from the electronic bandpass filter 250 is sent to an external detector input port 254 of the FTIR spectrophotometer 100. The processed signal 256 such as the center burst of the interferogram will be displayed on a PC 258 that controls the operation of the FTIR spectrophotometer 100. In one embodiment, the optical adapter 401 is enclosed in a sealed box 260 to reduce light interference and vibration from the environment.

In summary, FIG. 4 illustrates one embodiment of the external adapter 401 for use with a spectrophotometry system 100 having a light source generating a source light beam 102 of collimated, coherent light. One feature of FIG. 4 is the reversed biased photodiodes 418, 420. The reference light detector comprises the reference photodiode 418 and the sample light detector comprises the sample photodiode 420. The cathode of the reference photodiode 418 is electrically connected by the central point A to the anode of the sample photodiode 420. The central point A provides the difference current signal 426 to the low noise preamplifier 246. The anode of the reference photodiode 418 is connected to reverse-biasing battery 422. The cathode of the sample photodiode 420 is connected to reverse-biasing battery 424. The low noise preamplifier 246 converts the difference current signal 426 into the difference voltage signal 248.

Referring to FIG. 4, the following describes an exemplary method of operation of the above-described embodiment illustrated wherein the external adapter 401 is used in liquid phase detection:

(1) A reference solvent is placed in both the reference cell 110 and the sample cell 112. The amplitude of the center burst displayed on PC 258 is minimized by moving the beamsplitter 104 in the direction perpendicular to the propagation direction of the IR beam 102 (as shown by the double headed arrow in FIG. 4), thereby determining the position of the beamsplitter 104 at which noise is minimized, as noted herein. A relatively high baseline gain resistor value (e.g., 100 kΩ) may be used for the preamplifier 246 during this process. Once the beamsplitter 104 is positioned to minimize the center burst, the reference channel R and the sample channel S are balanced, and at least some of if not all of the source noise is cancelled in the differential current signal 426.

(2) After the beamsplitter 104 is positioned to minimize the magnitude of the center burst, the baseline difference spectrum $V_B$ is measured. The same relatively high gain baseline resistor value (e.g., $R_1$=100 kΩ) on the low noise preamplifier 246 is used during this baseline process.

(3) The reference solvent in the sample cell 112 is replaced with a sample solution to be characterized. The sample difference spectrum $V_S$ corresponding to the difference signal 426 is recorded. A high gain sample resistor value (e.g., $R_3$=100 kΩ) on the low noise preamplifier 246 is used during this process.

(4) The sample beam 108 is then blocked from reaching the sample detector 420, such as by using a light shutter (not shown in FIG. 4) positioned between the beamsplitter 104 and the sample photodiode 420. The reference spectrum, $V_R$ is recorded. A relatively low gain reference resistor value (e.g., $R_2$=5 kΩ) on the preamplifier 246 is used during this process.

Transmittance (T) and Absorbance (Abs) can be calculated as a function of the sample difference spectrum Vs, the reference spectrum $V_R$, the baseline difference spectrum $V_B$, the high gain baseline resistor value $R_1$, the low gain reference resistor value $R_2$, and the high gain sample resistor value $R_3$, using the following equations:

$$T = \frac{1 - \frac{V_S/R_3}{V_R/R_2}}{1 - \frac{V_B/R_1}{V_R/R_2}} \quad \text{Abs} = -\log T$$

In summary, FIG. 4 illustrates one embodiment of method of operation of the external adapter 401 for use with a spectrophotometry system 100 having a light source generating a source light beam 102 of collimated, coherent light. The reference photodiode 418 is used to detect at least a portion of the output reference beam and the sample photodiode 420 is used to detect at least a portion of the output sample beam. The cathode of the reference photodiode 418 is electrically connected by the central point A to the anode of the sample photodiode 420. The central point A provides the difference current signal. The anode of the reference photodiode 418 is connected to the reverse-biasing battery 422. The cathode of the sample photodiode 420 is connected to the reverse-biasing battery 424, and the low noise preamplifier 246 converts the difference current signal 426 into the difference voltage signal 248. The baseline difference spectrum $V_B$, the sample difference spectrum $V_S$, and the reference spectrum $V_R$ are determined. The spectrum of the sample substance is obtained based on the determined baseline difference spectrum $V_B$, the determined sample difference spectrum $V_S$, and the determined reference spectrum $V_R$. The low noise preamplifier 246 has a variable current-to-voltage conversion factor. A higher gain factor is used to determine the baseline difference spectrum $V_B$ and the sample difference spectrum $V_S$, and a lower gain factor is used to determine a reference spectrum $V_R$. Once difference between the method of operation of embodiment of FIGS. 1-2 and embodiment of FIG. 4 is that the embodiment of FIG. 3 includes biased photodiodes 418 and 420 which provide biased reference and sample signals at point A.

Figure 5:
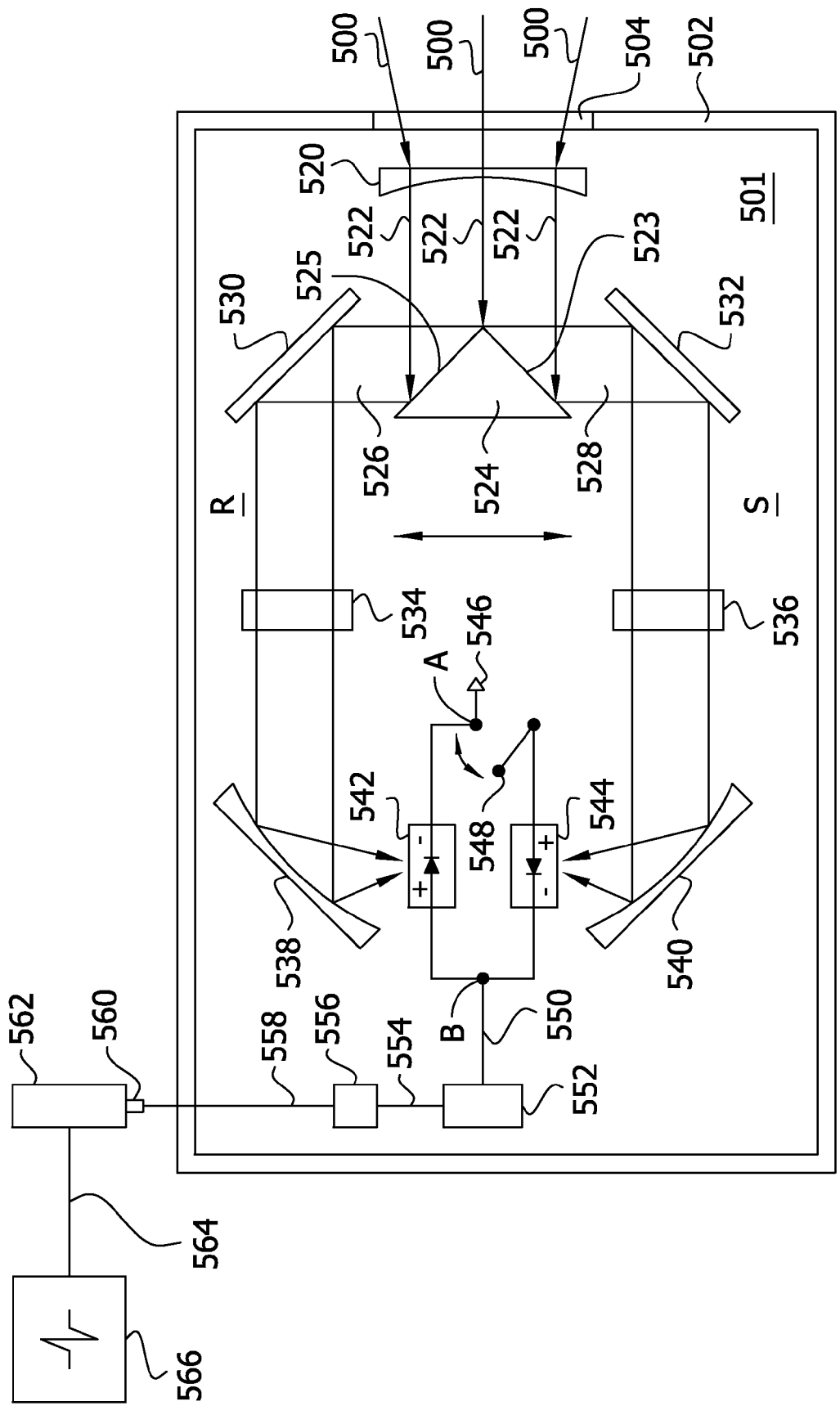
FIG. 5 shows the optical layout and electronics configuration of an exemplary internal adapter according to one embodiment of the invention.

Referring to FIG. 5, an optical layout and electronics configuration of an exemplary internal adapter 501 according to yet another embodiment of the invention is illustrated.

As shown in FIG. 5, a converging infrared (IR) beam 500 from the interferometer of an FTIR spectrophotometer 562 enters a sample compartment 502 of the FTIR spectrophotometer via a window 504. The converging IR beam 500 is converted into a collimated IR beam 522 by a plano-concave lens 520. The collimated IR beam 522 is split by a beamsplitter 524 into a reference beam 526 on a reference side R of the beamsplitter 524 and a sample beam 528 on a sample side S of the beamsplitter 524. In one embodiment, the beamsplitter 524 is a 90° prism with two reflective surfaces 523 and 525 coated with a protective gold layer to provide uniform reflectivity in the entire infrared region from 700 nm to 10 µm. The beamsplitter 524 is mounted on an optical translation stage (not show) that enables the beamsplitter 524 to move in the direction perpendicular to the propagation direction of the IR beam 522 as indicated by the double-headed arrow. The reference beam 526, after being reflected by a flat mirror 530 and passing through a reference cell 534, is reflected and focused by a concave mirror 538 onto a reference photodiode detector 542. The sample beam 528, after being reflected by a flat mirror 532 and passing through a sample cell 536, is reflected and focused by a concave mirror 540 onto a sample photodiode detector 544. To achieve more accurate results, matched optical cells, 534 and 536, may be used and matched IR detectors, 542 and 544, may be used.

In one embodiment, the reference detector 542 and the sample detector 544 each comprise a photodiode having a cathode and an anode. The cathode (negative end) of the reference photodiode detector 542 is electrically connected to an electric ground 546 of the electronics of the system at point A. The anode (positive end) of the reference photodiode detector 542 is electrically connected to an output point B. The anode (positive end) of the sample photodiode detector 544 is electrically connected to a switch 548 which selectively connects the ground point A. The cathode (negative end) of the sample photodiode detector 544 is electrically connected to the output point B.

When the switch 548 is closed, the anode of sample photodiode detector 544 is electrically connected to the point A. The anode of the reference photodiode detector 542 is electrically connected to the cathode of the sample photodiode detector 544 at point B. The combined current signal 550 from point B is sent to a low-noise preamplifier 552 where the combined current signal 550 is converted into a voltage signal 554.

The preamplifier 552 has different current-to-voltage conversion factors, e.g., 5 kΩ, 10 kΩ, 50 kΩ, 100 kΩ, and 500 kΩ. The output voltage signal 554 from the preamplifier 552 is sent to an electronic bandpass filter device 556 that has variable band center (e.g., $f_o$=100 Hz to $f_o$=100 kHz) and variable bandwidth (e.g., Δf=10 Hz to Δf=1000 Hz). The voltage signal 558 from the electronic bandpass filter 556 is sent to an external detector input port 560 of the FTIR spectrophotometer 562. The processed signal 564 such as the center burst of the interferogram will be displayed on a PC 566 that controls the operation of the FTIR spectrophotometer 562. In one embodiment, the optical adapter 501 is enclosed in the sealed sample compartment 502 to reduce light interference and vibration from the environment. The circuit is configured such that the reference voltage 554 is positive when the switch 548 is open (i.e., when the anode of the sample photodiode 544 is electrically open circuited and disconnected from the point A).

In summary, FIG. 5 illustrates one embodiment of the internal adapter 501 for use with a spectrophotometry system 562 having a light source generating a source light beam 500. In another aspect of the invention, an internal optical adapter 501 which can be part of commercial FTIR spectrophotometers or which can be retrofitted into the sample compartment 502 of most commercial FTIR spectrophotometers is illustrated in FIG. 5.

The spectrophotometry system 562 of FIG. 5 comprises the light source generating the light beam 500 and the lens 520 in the path of the light beam and transmitting the light beam as the collimated, coherent source light beam 522. The optical system within the compartment 502 includes the moveable beamsplitter 524 for splitting the collimated, coherent source light beam 522 into the reference beam 526 directed in the first reference path R and the sample beam 528 directed in the second sample path S different from the first path. The beamsplitter 524 is moveable between the first and second paths to determine the center burst minimizing position, as noted herein. The reference cell 534 includes the reference for interacting with the reference beam 526 to yield the output reference beam having a direction. The reference light detector 542 detects at least a portion of the output reference beam based on the direction of the output reference beam and generates the reference signal representative of the detected light. The sample cell 536 includes the sample for interacting with the sample beam 528 to yield the output sample beam having a direction. The sample light detector 544 detects at least a portion of the output sample beam based on the direction of the output sample beam and generates the sample signal representative of the detected light. The reference light detector 542 comprises a reference photodiode and the sample light detector 544 comprises a sample photodiode. The switch 548 selectively electrically connects the grounded cathode of the reference photodiode 542 at point A and the anode of the sample photodiode 544. The anode of the reference photodiode 542 is connected to the cathode of the sample photodiode 544 at the point B which provides the current signal 550. The preamplifier 552 converts the current signal 550 into the reference voltage signal (when the switch 548 is open) and the difference voltage signal (when the switch 548 is closed). The amplifier 552 has different current-to-voltage conversion factors.

Referring to FIG. 5, the following describes an exemplary method of operation of the above-described embodiment illustrated wherein the internal adapter 501 is used in liquid phase detection:

(1) Switch 548 is closed to electrically connect and ground the anode of the sample detector 544 to point A, which is at ground potential 546.

(2) A reference solvent is placed in both the reference cell 534 and the sample cell 536. A relatively high gain baseline resistor value $R_1$ (e.g., 100 kΩ) is selected for the preamplifier 552 during this process. The amplitude of the FTIR interferogram center burst displayed on the PC 566 is minimized by moving the beamsplitter 524 in the direction perpendicular to the propagation direction of the collimated IR beam 522 (as shown by the double headed arrow in FIG. 5), thereby determining the position of the beamsplitter 524 at which noise is minimized, as noted herein. Once the minimizing location of the beamsplitter 524 is determined, it is positioned at the determined minimizing location to minimize the center burst. As a result, the reference channel R and the sample channel S are balanced, and at least some of if not all of the source noise is cancelled in the differential current signal 550. At this point, the spectrophotometer has been calibrated to minimize source noise.

(3) After the beamsplitter 524 is positioned to minimize the magnitude of the center burst, a baseline difference spectrum $V_B$ is measured. A relatively high gain baseline resistor value (e.g., $R_1$=100kΩ) on the preamplifier 552 is used during this baseline process.

(4) The anode of the sample photodiode 544 is then disconnected from point A by opening the switch 548 to disconnect the anode of the sample detector 544 from the cathode of the reference detector 542, which is grounded at point A. A reference spectrum $V_R$ is measured. A relatively low gain reference resistor value (e.g., $R_2$=5 kΩ) on the preamplifier 552 is used during this process. (5) The reference solvent in the sample cell 536 is replaced with a sample solution to be characterized. Switch 548 is closed to electrically connect and ground the anode of the sample detector 544 to point A. The sample difference spectrum Vs is then recorded. A high gain sample resistor value (e.g., $R_3$=100 kΩ) on the preamplifier 552 is used during this process.

Transmittance (T) and Absorbance (A) can be calculated as a function of the sample difference spectrum Vs, the reference spectrum $V_R$, the baseline difference spectrum $V_B$, the high gain baseline resistor value $R_1$, the low gain reference resistor value $R_2$, and the high gain sample resistor value $R_3$, using the following equations:

$$T = \frac{1 - \frac{V_S/R_3}{V_R/R_2}}{1 - \frac{V_B/R_1}{V_R/R_2}} \quad \text{Abs} = -\log T$$

In summary, FIG. 5 illustrates one embodiment of the method of operation of the internal adapter 501 for use with a spectrophotometry system 562 having a light source generating a source light beam 500. Once difference between the method of operation of embodiment of FIGS. 1-2 and embodiment of FIG. 5 is that the embodiment of FIG. 3 includes biased photodiodes 542 and 544 which provide biased reference and sample signals at point B.

In FIGS. 1-5, the settings of the optional variable bandwidth and the band center of the electronic bandpass filters 142, 250, 556 depend on the following factors:

(1) Center wavelength of the optical absorption band,
(2) Full width at half maximum (FWHM) bandwidth of the optical absorption band, and
(3) The speed at which the moving mirror of the FTIR spectrophotometer travels.

For example, a near infra-red (NIR) band is centered at $\tilde{v}_0$=10,000 cm$^{-1}$ ($\lambda_o$=1000 nm), and has an optical bandwidth (FWHM) of $\Delta v$=4 cm$^{-1}$. Assuming the moving mirror speed of the FTIR spectrophotometer is V=0.25 cm/s, the center frequency of the electronic bandpass filter 556 should be set at $f_o$=2V$\tilde{v}_0$=5 kHz. The FWHM optical bandwidth translates into an electronic bandwidth of 2V($\Delta v$)=2 Hz. As such, the bandwidth of the electronic bandpass filters 142, 250, 556 should be wide enough to allow the entire band to be displayed without distortion. In this particular case, $\Delta f$=20 Hz should provide sufficient resolution. Although a larger $\Delta f$ may be desirable for displaying a larger spectral region, the overall baseline noise is proportional to the square root of $\Delta f$. Considering the above, a balanced choice should be selected.

In summary, FIGS. 1-5 illustrate embodiments of the adapter, which adapter may be a separate add-on or retrofit to an existing spectrophotometer and/or which may be an integral portion of a spectrophotometer and/or which may be a combination of both. Optionally, the adapter may include the variable bandpass filter 142, 250, 556 between the detector circuit and the processor 150, 258, 566 for filtering the voltage signal 140, 248, 554 in which case the processor is configured to determine the spectrum of the sample based on the filtered voltage signal 144, 252, 558. The variable bandpass filter 142, 250, 556 may have a variable band center and a variable bandwidth so that the band center and the bandwidth are a function of the center wavelength of the optical absorption band, the full width at half maximum (FWHM) bandwidth of the optical absorption band and the speed at which the moving mirror of the FTIR spectrophotometer travels.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be implemented in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein.

Embodiments of the invention which are implemented with computer-executable instructions may be organized into one or more computer-executable components or modules on a tangible computer readable storage medium. Aspects of the invention may be implemented with any number and organization of such components or modules.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An adapter for use with a spectrophotometry system having a light source generating a source light beam of coherent light, said adapter comprising:
    a sealed housing for receiving the source light beam;
    an optical system within the housing for reflecting the source beam and for splitting the source light beam into a reference beam of reflected light directed in a first path and a sample beam of reflected light directed in a second path different from the first path;
    a reference cell within the housing, said reference cell including a reference for interacting with the reference beam wherein said interacting yields an output reference beam having a direction;
    a reference light biased photodetector for detecting at least a portion of the output reference beam based on the direction of the output reference beam and generating a reference signal representative of the detected light;
    a sample cell within the housing, said sample cell including a sample for interacting with the sample beam wherein said interacting yields an output sample beam having a direction;
    a sample light biased photodetector for detecting at least a portion of the output sample beam based on the direction of the output sample beam and generating a sample signal representative of the detected light wherein the reference light biased photodetector is reverse biased as compared to the sample light photodetector, said reference light biased photodetector generating a reverse biased reference signal or wherein the sample light biased photodetector is reverse biased compared to the reference light photodetector, said sample light biased photodetector generating a reverse biased sample signal;
    a detector circuit adapted to produce a difference signal proportional to the difference between the reverse biased reference signal and the sample signal when the reference light biased photodetector is reverse biased or wherein the detector circuit is adapted to produce a difference signal proportional to the difference between the reference signal and the reverse biased sample signal when the sample light biased photodetector is reverse biased; and
    a processor configured to determine a spectrum of the sample based on the difference signal.

2. An adapter for use with a spectrophotometry system having a light source generating a source light beam of coherent light, said adapter comprising:
    a sealed housing for receiving the source light beam;
    an optical system within the housing for splitting the source light beam into a reference beam directed in a first path and a sample beam directed in a second path different from the first path;
    a reference cell within the housing, said reference cell including a reference for interacting with the reference beam wherein said interacting yields an output reference beam having a direction;
    a reference light biased photodetector for detecting at least a portion of the output reference beam based on the direction of the output reference beam and generating a reference signal representative of the detected light;
    a sample cell within the housing, said sample cell including a sample for interacting with the sample beam wherein said interacting yields an output sample beam having a direction;
    a sample light biased photodetector for detecting at least a portion of the output sample beam based on the direction of the output sample beam and generating a sample signal representative of the detected light;
    a detector circuit for producing a difference signal proportional to the difference between the reference signal and the sample signal; and
    a processor configured to determine a spectrum of the sample based on the difference signal wherein the reference light biased photodetector comprises a reference photodiode and the sample light biased photodetector comprises a sample photodiode and further comprising a switch selectively electrically connecting a grounded cathode of the reference photodiode and an anode of the sample photodiode and wherein an anode of the reference photodiode is connected to a cathode of the sample photodiode at a point which provides a current signal, and an amplifier converting the current signal into a reference voltage and a difference voltage.

3. The adapter of claim 2 wherein the amplifier has different current-to-voltage conversion factors adapted to provide a higher gain factor for indicating a baseline difference spectrum and a sample difference spectrum, and adapted to provide a lower gain factor for indicating a reference spectrum.

4. The adapter of claim 1 wherein the reference light biased photodetector comprises a reference photodiode and the sample light biased photodetector comprises a sample photodiode and wherein a cathode of the reference photodiode is electrically connected by a central point to an anode of the sample photodiode, the central point providing a current signal, wherein an anode of the reference photodiode is connected to reverse-biasing battery, wherein a cathode of the sample photodiode is connected to reverse-biasing battery, and an amplifier converting the current signal into a reference voltage and a difference voltage.

5. The adapter of claim 4 wherein the amplifier has different current-to-voltage conversion factors adapted to provide a higher gain factor for indicating a baseline difference spectrum and a sample difference spectrum, and adapted to provide a lower gain factor for indicating a reference spectrum.

6. The adapter of claim 1 wherein the optical system comprises a single, moveable beamsplitter having first and second reflecting surfaces, each coated with a reflecting layer, said beamsplitter for splitting the source light beam into:
(1) a reference beam reflected by the first reflecting surface to form a first linear path different from the source path, and
(2) a sample beam reflected by the second reflecting surface to form a second linear path different from the source path and different from the first linear path, wherein the beamsplitter and its first and second reflecting surfaces are moveable together in a direction perpendicular to the propagation path of the source beam between the first and second linear paths to minimize source noise and to minimize a centerburst of a waveform of an interferogram of the reference beam and the sample beam.

7. The adapter of claim 1 wherein the detector circuit comprises a circuit for selectively producing a reference voltage proportional to the reference signal and a difference voltage proportional to the difference between the reference signal and the sample signal wherein the optical system comprises a beamsplitter moveable along the first and second paths to a position at which noise cancellation is increased and the signal to noise ratio of the difference signal is increased.

8. The adapter of claim 1 further comprising a variable electronic bandpass filter between the detector circuit and the processor adapted to filter the difference signal at two or more different bandwidths and wherein the processor is configured to determine a spectrum of the sample based on the filtered difference signals corresponding to the two or more different bandwidths.

9. The adapter of claim 8 wherein the spectrophotometry system comprises an FTIR spectrophotometer with a moving mirror and wherein the variable electronic bandpass filter has a variable band center and a variable bandwidth and wherein the band center and the bandwidth are a function of: (1) a center wavelength of the optical absorption band, (2) a full width at half maximum (FWHM) bandwidth of the optical absorption band and (3) a speed at which the moving mirror of the FTIR spectrophotometer travels.

10. A spectrophotometry system comprising:
a light source generating a light beam;
a lens in a path of the light beam and transmitting the light beam as a coherent source light beam;
an optical system within the housing for reflecting the source beam and for splitting the source light beam into a reference beam of reflected light directed in a first path and a sample beam of reflected light directed in a second path different from the first path;
a reference cell including a reference for interacting with the reference beam wherein said interacting yields an output reference beam having a direction;
a reference light biased photodetector for detecting at least a portion of the output reference beam based on the direction of the output reference beam and generating a reference signal representative of the detected light;
a sample cell including a sample for interacting with the sample beam wherein said interacting yields an output sample beam having a direction;
a sample light biased photodetector for detecting at least a portion of the output sample beam based on the direction of the output sample beam and generating a sample signal representative of the detected light wherein the reference light biased photodetector is reverse biased as compared to the sample light photodetector, said reference light biased photodetector generating a reverse biased reference signal or wherein the sample light biased photodetector is reverse biased compared to the reference light photodetector, said sample light biased photodetector generating a reverse biased sample signal;
a detector circuit adapted to produce a difference signal proportional to the difference between the reverse biased reference signal and the sample signal when the reference light biased photodetector is reverse biased or wherein the detector circuit is adapted to produce a difference signal proportional to the difference between the reference signal and the reverse biased sample signal when the sample light biased photodetector is reverse biased;
a sealed housing for enclosing the above; and
a processor configured to determine a spectrum of the sample based on the difference signal.

11. A spectrophotometry system comprising:
a light source generating a light beam;
a lens in a path of the light beam and transmitting the light beam as a coherent source light beam;
an optical system for splitting the source light beam into a reference beam directed in a first path and a sample beam directed in a second path different from the first path;
a reference cell including a reference for interacting with the reference beam wherein said interacting yields an output reference beam having a direction;
a reference light biased photodetector for detecting at least a portion of the output reference beam based on the direction of the output reference beam and generating a reference signal representative of the detected light;
a sample cell including a sample for interacting with the sample beam wherein said interacting yields an output sample beam having a direction;
a sample light biased photodetector for detecting at least a portion of the output sample beam based on the direction of the output sample beam and generating a sample signal representative of the detected light;
a detector circuit for producing a difference signal proportional to the difference between the reference signal and the sample signal;
a sealed housing for enclosing the above; and
a processor configured to determine a spectrum of the sample based on the difference signal wherein the reference light biased photodetector comprises a reference photodiode and the sample light biased photodetector comprises a sample photodiode and further comprising a switch selectively electrically connecting a grounded cathode of the reference photodiode and an anode of the sample photodiode and wherein an anode of the reference photodiode is connected to a cathode of the sample photodiode at a point which provides a current signal, and an amplifier converting the current signal into a reference voltage and a difference voltage.

12. The system of claim 11 wherein the amplifier has different current-to-voltage conversion factors adapted to provide a higher gain factor for indicating a baseline difference spectrum and a sample difference spectrum, and adapted to provide a lower gain factor for indicating a reference spectrum.

13. The system of claim 10 wherein the reference light biased photodetector comprises a reference photodiode and the sample light biased photodetector comprises a sample photodiode and wherein a cathode of the reference photodiode is electrically connected by a central point to an anode of the sample photodiode, the central point providing a current signal, wherein an anode of the reference photodiode is connected to reverse-biasing battery, wherein a cathode of the sample photodiode is connected to reverse-biasing battery, and an amplifier converting the current signal into a reference voltage and a difference voltage.

14. The system claim 13 wherein the amplifier has different current-to-voltage conversion factors adapted to provide a higher gain factor for indicating a baseline difference spectrum and a sample difference spectrum, and adapted to provide a lower gain factor for indicating a reference spectrum.

15. The system of claim 10 wherein the optical system comprises a single, moveable beamsplitter having first and second reflecting surfaces, each coated with a reflecting layer, said beamsplitter for splitting the source light beam into:
   (1) a reference beam reflected by the first reflecting surface to form a first linear path different from the source path, and
   (2) a sample beam reflected by the second reflecting surface to form a second linear path different from the source path and different from the first linear path, wherein the beamsplitter and its first and second reflecting surfaces are moveable together in a direction perpendicular to the propagation path of the source beam between the first and second linear paths to minimize source noise and to minimize a centerburst of a waveform of an interferogram of the reference beam and the sample beam.

16. The system of claim 10 wherein the detector circuit comprises a circuit for selectively producing a reference voltage proportional to the reference signal and a difference voltage proportional to the difference between the reference signal and the sample signal wherein the optical system comprises beamsplitter moveable along the first and second paths to a position at which noise cancellation is increased and the signal to noise ratio of the difference signal is increased.

17. The system of claim 10 further comprising a variable electronic bandpass filter between the detector circuit and the processor adapted to filter the difference signal at two or more different bandwidths and wherein the processor is configured to determine a spectrum of the sample based on the filtered difference signals corresponding to the two or more different bandwidths.

18. The system of claim 17 wherein the spectrophotometry system comprises an FTIR spectrophotometer with a moving mirror and wherein the variable electronic bandpass filter has a variable band center and a variable bandwidth and wherein the band center and the bandwidth are a function of: (1) a center wavelength of the optical absorption band, (2) a full width at half maximum (FWHM) bandwidth of the optical absorption band and (3) a speed at which the moving mirror of the FTIR spectrophotometer travels.

* * * * *